(12) United States Patent
Wilber

(10) Patent No.: US 11,577,575 B2
(45) Date of Patent: Feb. 14, 2023

(54) ADJUSTABLE HYDRAULIC SUSPENSION DAMPER

(71) Applicant: AFCO Performance Group, LLC, Lincoln, NE (US)

(72) Inventor: Alan Jeffrey Wilber, Newburgh, IN (US)

(73) Assignee: AFCO Performance Group, LLC, Boonville, IN (US)

( * ) Notice: Subject to any disclaimer, the term of this patent is extended or adjusted under 35 U.S.C. 154(b) by 0 days.

(21) Appl. No.: 17/446,378

(22) Filed: Aug. 30, 2021

(65) Prior Publication Data

US 2022/0063367 A1 Mar. 3, 2022

Related U.S. Application Data

(60) Provisional application No. 62/706,642, filed on Aug. 31, 2020.

(51) Int. Cl.
| | |
|---|---|
| *B60G 17/08* | (2006.01) |
| *B60G 13/00* | (2006.01) |
| *B60G 13/08* | (2006.01) |
| *B60G 17/016* | (2006.01) |
| *F16F 9/46* | (2006.01) |

(Continued)

(52) U.S. Cl.
CPC .......... *B60G 17/08* (2013.01); *B60G 13/001* (2013.01); *B60G 13/08* (2013.01); *B60G 17/016* (2013.01); *B60G 2202/24* (2013.01); *B60G 2204/62* (2013.01); *B60G 2206/41* (2013.01); *B60G 2500/104* (2013.01); *B60G 2600/182* (2013.01); *B60G 2800/162* (2013.01); *B60G 2800/916* (2013.01)

(58) Field of Classification Search
CPC .... B60G 13/001; B60G 13/08; B60G 17/016; B60G 17/08; B60G 2202/24; B60G 2204/62; B60G 2206/41; B60G 2500/104; B60G 2600/182; B60G 2800/162; B60G 2800/916; F16F 9/185; F16F 9/3292; F16F 9/461
See application file for complete search history.

(56) References Cited

U.S. PATENT DOCUMENTS

| | | |
|---|---|---|
| 5,263,559 A | 11/1993 | Mettner |
| 5,295,563 A | 3/1994 | Bennett |
| 5,392,885 A | 2/1995 | Patzenhauer et al. |

(Continued)

*Primary Examiner* — James A English
*Assistant Examiner* — Daniel M. Keck
(74) *Attorney, Agent, or Firm* — Woodard, Emhardt, Henry, Reeves & Wagner, LLP

(57) ABSTRACT

A hydraulic damper with one end connected to the body of a vehicle and a second end connected to a suspension system of a vehicle. The mechanism allows for multiple hydraulic-fluid metering valve positions to control piston resistance based on a variable pressure input using pressurized gas. The use of compressed gas to mechanically control a valve position allows changes to the piston resistance to be made quickly and to be increased or decreased as desired. The hydraulic damper features a control piston which in turn mechanically controls a valve needle within a hydraulic suspension piston. The position of the valve needle controls the damping characteristics of the suspension piston. When the control piston moves, the position of the valve needle is proportionally adjusted.

20 Claims, 6 Drawing Sheets

(51) Int. Cl.
*F16F 9/18* (2006.01)
*F16F 9/32* (2006.01)

(56) References Cited

U.S. PATENT DOCUMENTS

| | | |
|---|---|---|
| 5,924,528 A | 7/1999 | Vermolen et al. |
| 6,527,093 B2 | 3/2003 | Oliver et al. |
| 7,413,062 B2 | 8/2008 | Vandewal |
| 8,210,330 B2 | 7/2012 | Vandewal |
| 8,403,115 B2 | 3/2013 | Gartner et al. |
| 9,080,631 B2 * | 7/2015 | Hoult ........................ F16F 9/26 |
| 2009/0200760 A1 * | 8/2009 | Gartner .................. F16F 9/585 |
| | | 280/5.515 |
| 2018/0119770 A1 * | 5/2018 | Bruno ........................ F16F 9/49 |
| 2021/0207679 A1 * | 7/2021 | Yamashita ................ F16F 9/46 |
| 2022/0009304 A1 * | 1/2022 | Leclerc ..................... F16F 9/54 |
| 2022/0018417 A1 * | 1/2022 | Yamashita ............ F16F 9/5126 |
| 2022/0163088 A1 * | 5/2022 | Gagnon .................. F16F 9/342 |
| 2022/0176769 A1 * | 6/2022 | Tong ........................ F16F 9/48 |

* cited by examiner

ADJUSTABLE HYDRAULIC SUSPENSION DAMPER

CROSS-REFERENCE TO RELATED APPLICATION

This application claims the benefit of U.S. Provisional Application No. 62/706,642 filed Aug. 31, 2020, which is hereby incorporated by reference.

FIELD OF DISCLOSURE

The present disclosure relates in general to hydraulic suspension dampers, and specifically deals with a mechanism for multiple hydraulic-fluid metering valve positions within such dampers based on variable pressure inputs using compressed gas.

BACKGROUND

Hydraulic dampers are used in conjunction with automotive suspension systems to absorb unwanted vibrations caused by the force applied from a road or rough terrain while traveling over it. To absorb the unwanted vibrations, dampers are generally connected between the body and the suspension of the automobile. A piston, including a piston head and a piston rod, is located within a pressure tube of the damper and the pressure tube is normally attached to the suspension portion of the vehicle. The piston head is often attached to the piston rod which extends through the pressure tube to be connected to the body of the vehicle. The piston head divides the pressure tube into an upper working chamber and a lower working chamber both of which are typically filled with hydraulic fluid. Valve shims on the piston head define a fluid flow path through the piston head. As used herein, fluid can mean either a liquid or a gas. Because the piston limits the flow of the hydraulic fluid between the upper and the lower working chambers when the damper is compressed or extended, the damper is able to produce a damping force which counteracts the force which would otherwise be transmitted from the suspension to the body of the vehicle and felt by the passengers of the vehicle. The valve shims can be asymmetric for expansion and contraction, for example by using check valves. A piston with less fluid flow provides a firmer suspension and more control while a piston with more fluid flow leads to a softer ride but less control.

Some prior dampers are adjustable. Prior adjustable suspension dampers are only mechanically adjustable or only single time adjustable. For instance, certain prior dampers use air pressure to hold the damper in a first position. When a timer elapses, the air pressure is released, allowing the damper to move to a second position where it remains until the system is reset. These systems are not dynamically adjustable. Additionally, loss of control pressure causes such dampers to default to an open position with more fluid flow, which can lead to less suspension control. In racing, dynamic control is especially desired. Due to the fast pace and frequent turns, it is desirable to have a suspension system with a quick response time capable of keeping up with the constant vibrations and bumps involved.

Some adjustable dampers have multiple position adjustment mechanisms which rely on stepper or servo-motor controls to move the metering valve into different positions. However, these are typically limited by a relatively slow response time.

It is desirable to provide dynamically adjustable hydraulic suspension dampers capable of constant adjustment.

Thus, there is a need for improvement in this field.

SUMMARY

Embodiments of the present disclosure are addressed to a dynamic adjustment mechanism for a hydraulic suspension damper. The mechanism allows for multiple hydraulic-fluid metering valve positions to control piston resistance based on a variable pressure input using compressed gas. The use of compressed gas to mechanically control a valve position allows changes to the piston resistance to be made quickly and to be increased or decreased as desired. The adjustment options are continuous within the adjustment range and can be dynamically controlled by control inputs, for instance by a computer in response to a time profile, sensor readings or otherwise.

The present disclosure features an air-controlled piston which in turn mechanically controls a valve needle within a hydraulic suspension piston. The position of the valve needle controls the damping characteristics of the suspension piston. The air-controlled piston is arranged in a base and spring-biased toward a pressure source. When air pressure is applied, it pushes the air-controlled piston laterally against the resistance spring. Thus, the position of the air-controlled piston is controllable and dependent upon the amount of applied air pressure.

In certain embodiments, an axis of the air-controlled piston is perpendicular to an axis of the valve needle. A lateral end of the air-controlled piston includes a conical wedge-shaped portion. The surface of the wedge-shaped portion defines an inclined height. The wedge-shaped portion operably engages the valve needle via a ball bearing. As the wedge-shaped portion reciprocates with the control piston, it changes the contact point position between the wedge surface and the ball bearing. The height of the contact point where the wedge surface engages the ball bearing determines the height of the ball bearing and consequently the height of the valve needle. In certain embodiments, as the air-controlled piston moves inward under pressure, the ball bearing and valve needle rise as they translate along the wedge-shaped portion. When the valve needle moves upward, its lower end moves upward from a lower needle seat. This opens or increases a bypass path allowing fluid in the suspension piston to bypass the main piston head, thus adjusting the damping characteristics. Conversely, when pressure is released, the control piston moves outward, forcing the ball bearing and valve needle downward and decreasing or closing the bypass path.

In an alternate embodiment, the control piston could be axially aligned with the valve needle. In that arrangement, no wedging would be needed.

Advantageously, the adjustment mechanism has an increased response time. Adjustments can be made very quickly based on pressure inputs to the system.

Advantageously, the adjustment mechanism increases control. Specific pressure inputs will result in specific valve positions therefore making the hydraulic-fluid valve within the suspension damper controllable anywhere within the performance range of the valve system. The system is not limited to a completely "open" or "closed" state.

Advantageously, the adjustment mechanism increases safety. The mechanism will default with the air-controlled piston fully closed by the resistance spring, restricting the bypass path. With the air-controlled piston fully closed, the valve needle fully contacts the needle seat closing the bypass path and resulting in the suspension damper having the most control in the valve circuit. Loss of system pressure is less likely to result in a reduction in vehicle control.

Advantageously, the system does not have to utilize external air cylinders or linkages and all moving parts may be contained within the housing mounted on the suspension damper.

Further forms, objects, features, aspects, benefits, advantages, and embodiments of the present disclosure will become apparent from a detailed description and drawings provided herewith.

DESCRIPTION OF THE SELECTED EMBODIMENTS

Figure 1:
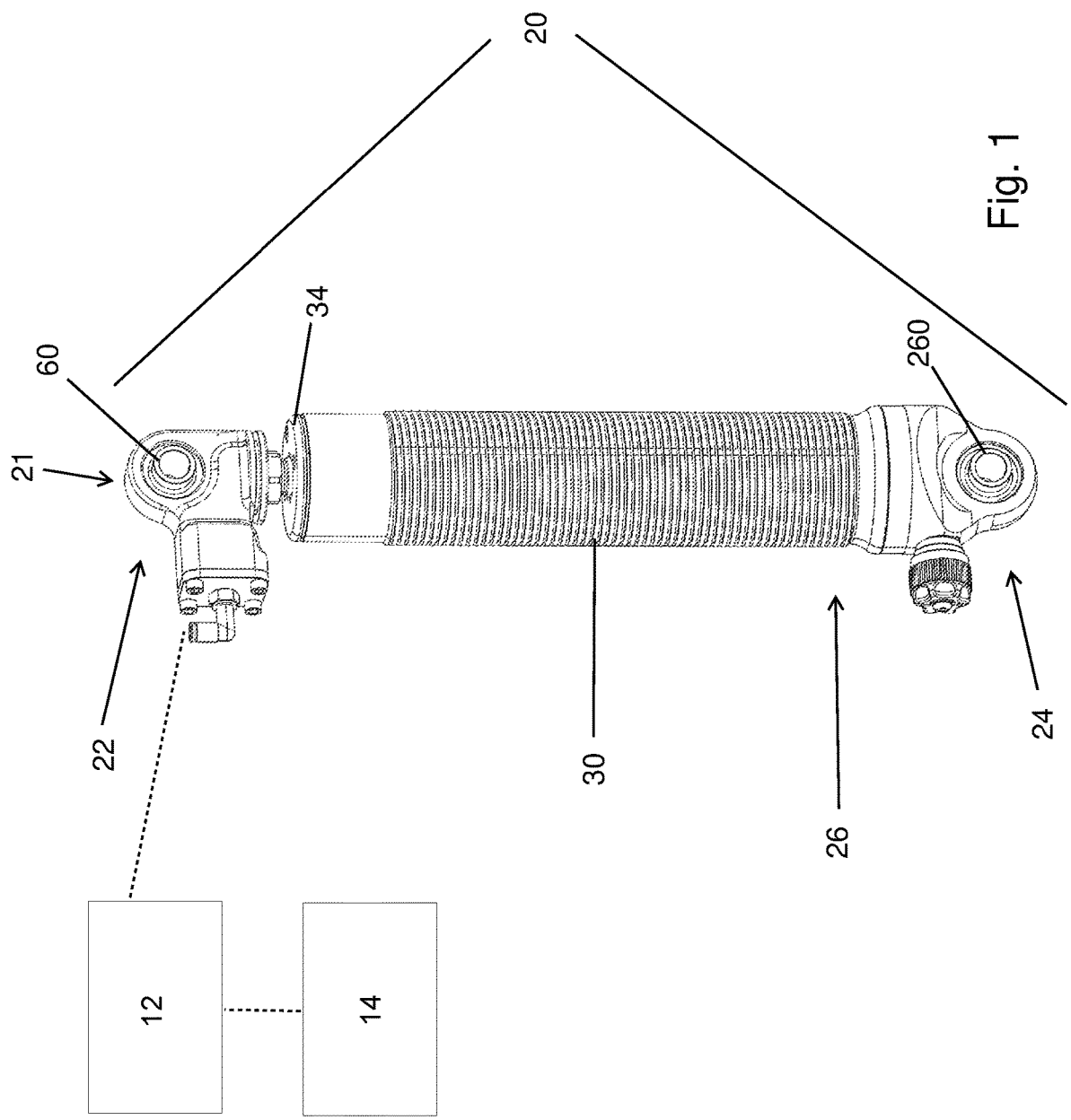
FIG. 1 is a perspective view of a hydraulic suspension damper according to certain embodiments of the disclosure.

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates. One embodiment of the disclosure is shown in great detail, although it will be apparent to those skilled in the relevant art that some features that are not relevant to the present disclosure may not be shown for the sake of clarity.

Embodiments of the present disclosure are addressed to a dynamic adjustment mechanism for a hydraulic suspension damper capable of constant adjustment, namely, a hydraulic damper with one end connected to the body of a vehicle and a second end connected to a suspension system of a vehicle. The mechanism allows for multiple hydraulic-fluid metering valve positions to control piston resistance based on a variable pressure input using pressurized gas. The use of compressed gas to mechanically control a valve position allows changes to the piston resistance to be made quickly and to be increased or decreased as desired. The adjustment options are continuous within the adjustment range and can be dynamically controlled by control inputs. The control inputs may be electrical, mechanical or magnetic, for instance by a computer 14 (shown schematically) in response to a time profile, sensor readings or otherwise. Further, the computer may control dampening in response to detected driving conditions, wherein increasing or decreasing the compressed air pressure applied proportionately increases or decreases the fluid flow path size.

The present disclosure features an air-controlled piston which in turn mechanically controls a valve needle within a hydraulic suspension piston. The position of the valve needle controls the damping characteristics of the suspension piston. The control piston is arranged in a base and spring-biased toward a pressure source. When air pressure is applied, it pushes the control piston laterally against the resistance spring. Thus, the position of the control piston is controllable and dependent upon the amount of applied air pressure.

FIG. 1 illustrates a damper 20 which is designed to absorb and damp shock impulses. Damper 20 may include an upper end 21 with a control piston assembly 22, a lower end 24, a damper piston assembly 26 (see FIG. 2), pressure tube 140 and reservoir tube 30 extending between the control piston assembly 22 and lower end 24. Pressure tube 140 defines an interior cavity. Hydraulic fluid typically fills at least a portion of the interior cavity of the pressure tube. Lower end 24 closes the bottom end of damper 20. Upper end 21 and control piston assembly 22 connect to upper end of piston rod 150 (see FIG. 2). Piston rod 150 extends through a sealed fitting in a cap 34 on reservoir tube 30 and pressure tube 140. Upper end 21 may include bushing 60 to attach damper 20 to a vehicle body in a conventional manner. Lower end 24 may include bushing 260 to attach damper 20 to an appropriate suspension component.

Figure 2:
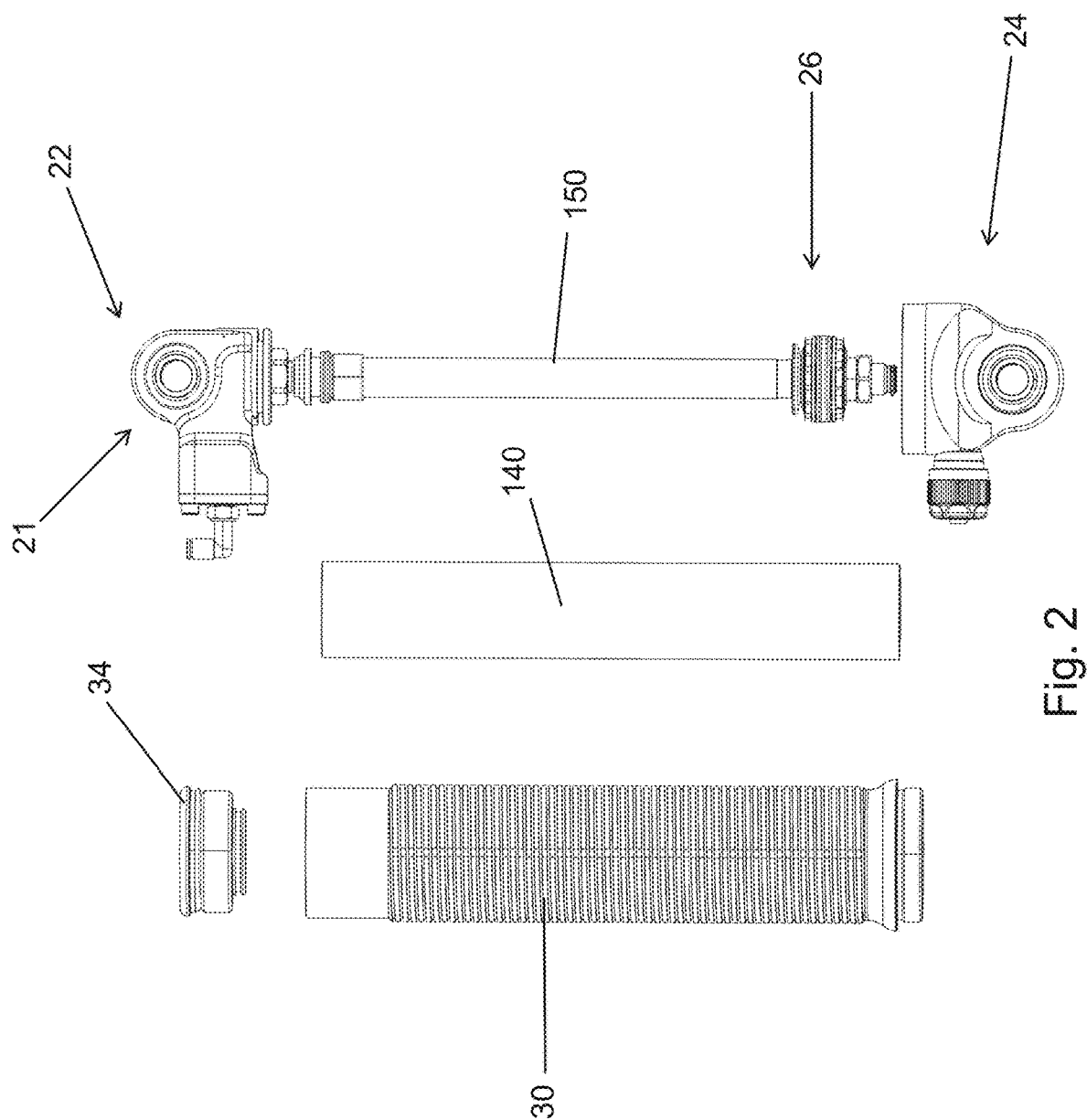
FIG. 2 is a perspective view of the hydraulic suspension damper of FIG. 1 with a reservoir tube and a pressure tube removed.

FIG. 2 illustrates the exploded configuration of various components of damper 20. FIG. 2 demonstrates reservoir tube 30 and a pressure tube 140 removed from the damper, exposing the piston rod 150. Controllable valve needle 90 is within piston rod 150 as illustrated and explained in more detail below. The system can be set to control rebound damping only, compression damping only or both rebound and compression damping.

Figure 3:
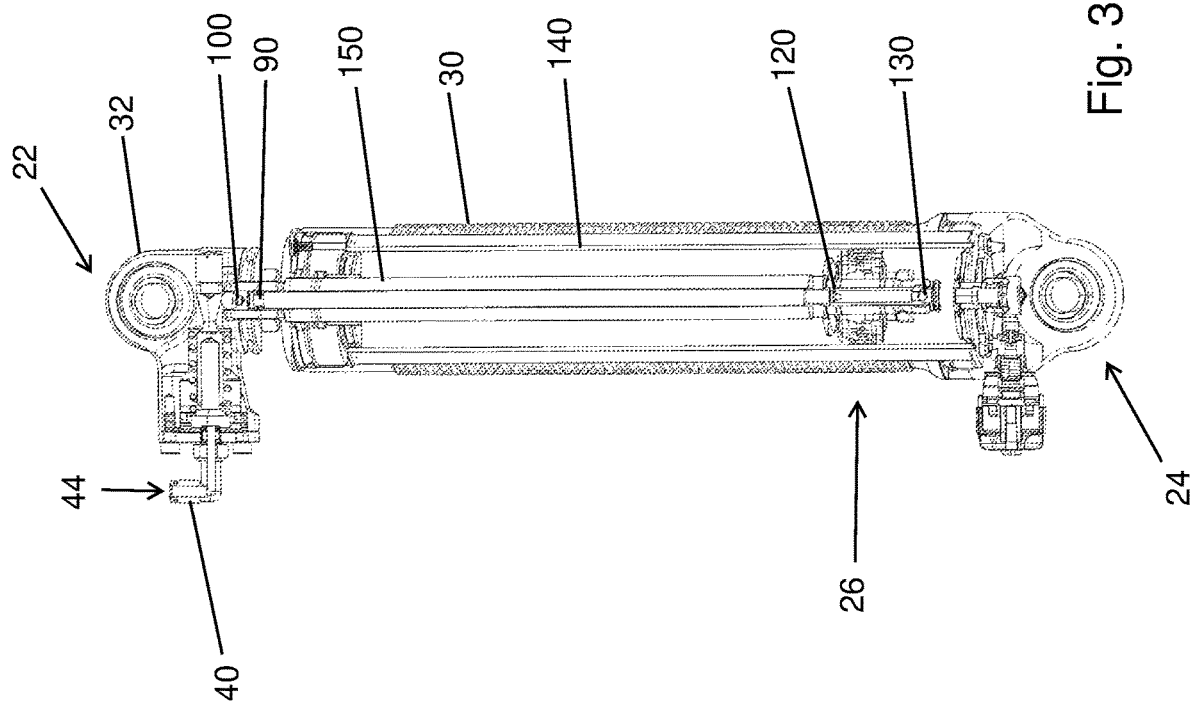
FIG. 3 is a cross-sectional view of the hydraulic suspension damper of FIG. 1.
Figure 4:
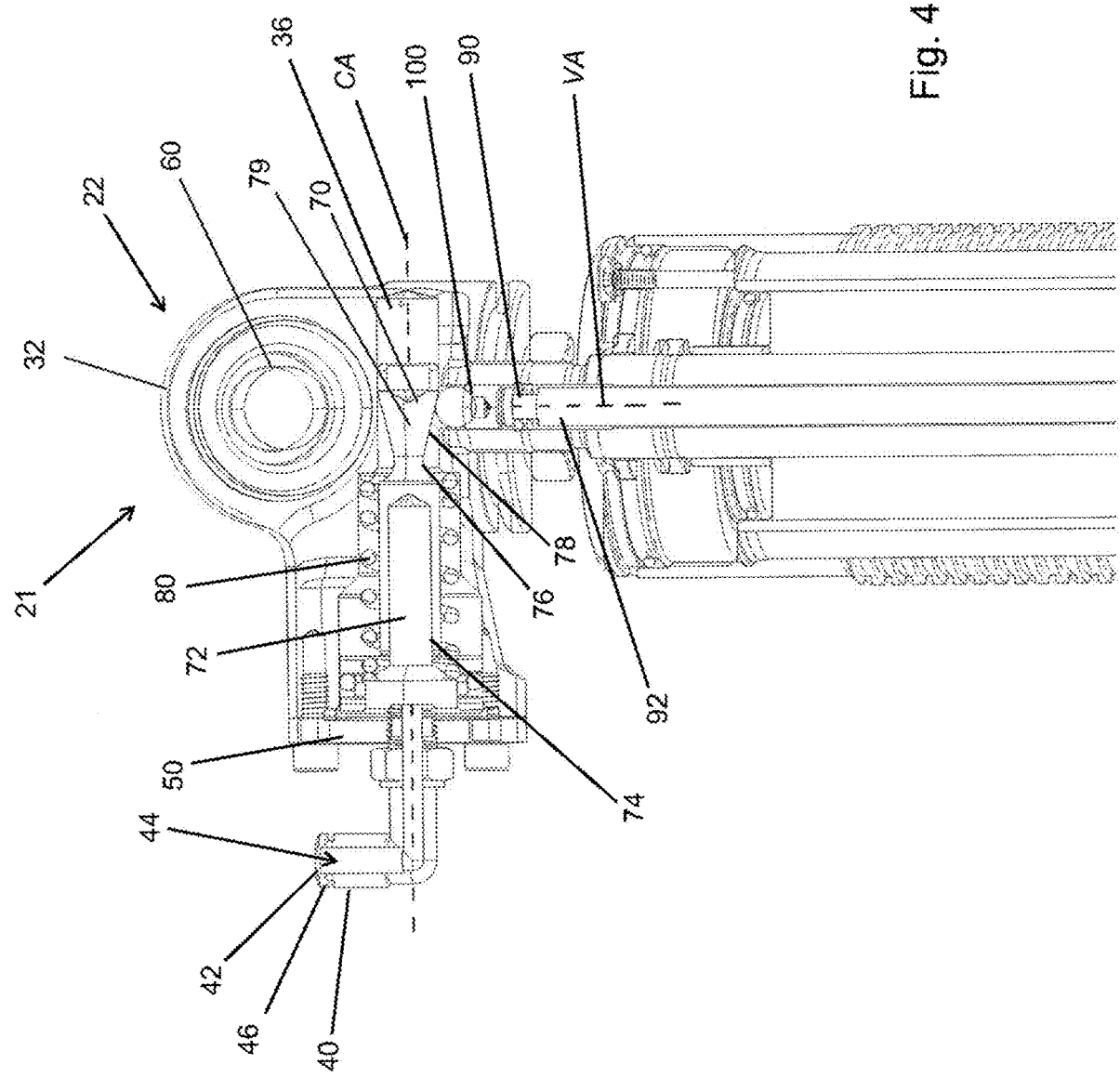
FIG. 4 is a cross-sectional view of a control piston assembly of the hydraulic suspension damper of FIG. 1.
Figure 5:
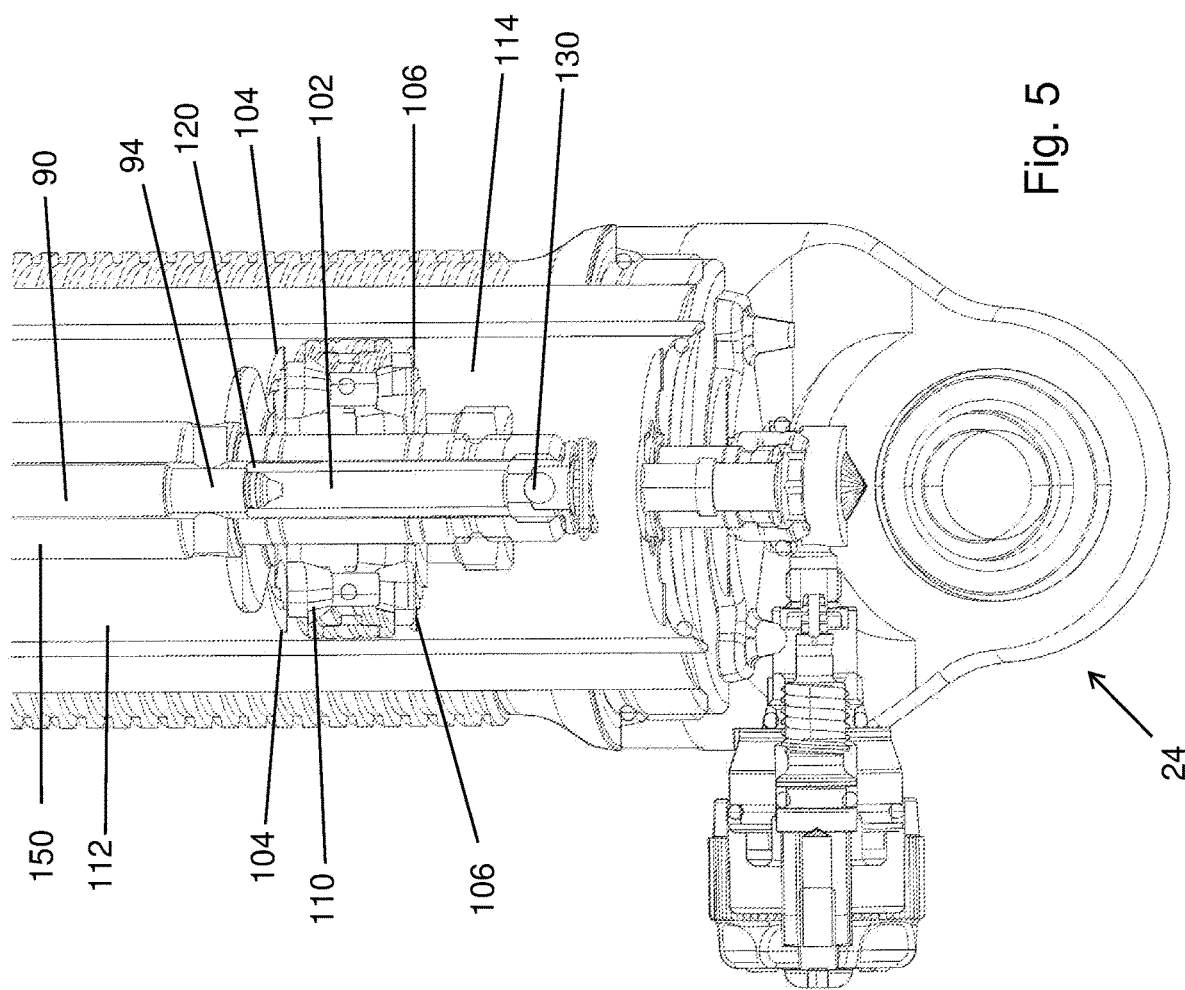
FIG. 5 is a cross-sectional view of a damper piston assembly of the hydraulic suspension damper of FIG. 1.
Figure 6:
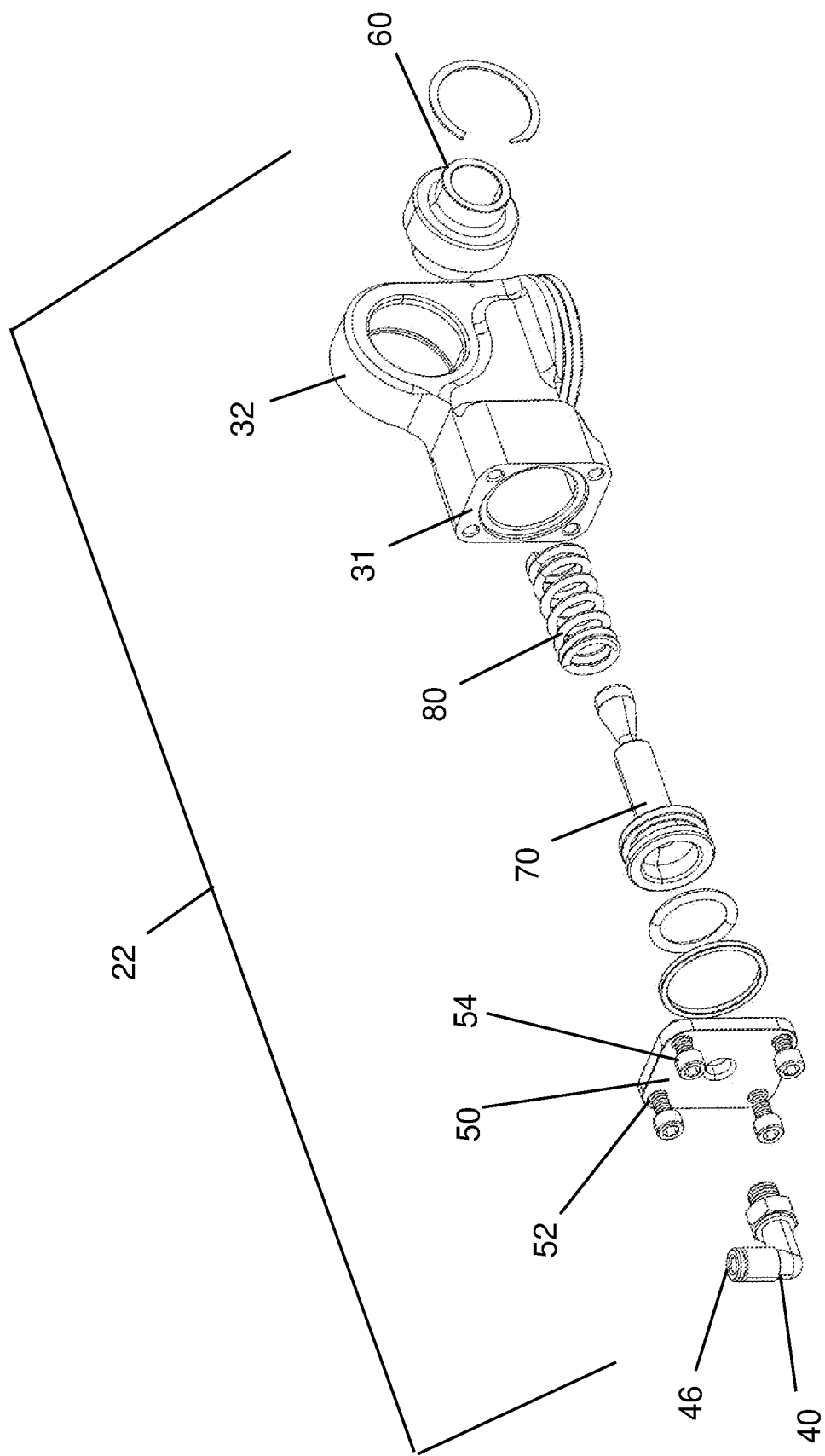
FIG. 6 is an exploded view of the control piston assembly of the hydraulic suspension damper of FIG. 1.

FIGS. 3-5 illustrate cross-sectional views of damper 20. FIG. 6 shows an exploded view of upper end 21 and the control piston assembly 22. As seen in FIGS. 4 and 6, the upper end 21 features a base 32 that defines a piston passage 36. The control piston assembly 22 includes an air-controlled piston 70 arranged in the piston passage 36 and capable of linearly translating within the piston passage 36. The air-controlled piston 70 may include a body defining a hollow interior cavity 72 with an inner surface 74. Control piston assembly 22 may further include a pressure input 40 to provide pressurized air to push the air-controlled piston 70. Pressure input 40 may include a fitting 46 to connect to an air supply 12 (shown schematically in FIG. 1). The compressed air pressure applied by air supply 12 to the control piston assembly 22 may be dynamically controlled by computer 14. The air supply is utilized to input compressed air pressure within the system. Pressure input 40 defines an opening 42 to a pressure input passage 44. Pressure input passage 44 allows pressurized air to travel from an air supply to the air-controlled piston 70 within the base. Air-controlled piston 70 slides within a defined range within the base in response to changes in compressed air pressure applied. Air-controlled piston 70 may be spring-biased by a resistance spring 80 toward the pressure input passage 44.

When air pressure is provided through the pressure input passage 44, it pushes the air-controlled piston/control piston 70 laterally inward against resistance spring 80. Thus, the position of the air-controlled piston 70 is dynamically adjustable and dependent upon the amount of applied air pressure as well as the resistance/spring constant of spring 80. In the absence of applied pressure, the resistance spring 80 is pre-loaded to hold the air-controlled piston 70 in the most outward position. The amount of load on the resistance spring 80 or the spring constant may be selected to alter the amount of air pressure necessary to push the air-controlled piston 70 a corresponding distance.

In certain embodiments, a movement axis CA of the air-controlled piston 70 is perpendicular to a movement axis VA of the valve needle 90. A lateral edge 76 of an inward end portion of the air-controlled piston 70 has a conical wedge-shaped portion 78 so the piston 70 may include the same profile regardless of rotational orientation. The surface 79 of the wedge-shaped portion 78 defines an inclined height. The wedge-shaped portion 78 operably contacts and engages the valve needle 90 via a ball bearing 100. Valve needle 90 is a rod which includes an upper end 92 and a lower end 94. Valve needle 90 is arranged within the piston rod 150 and configured to translate within a defined range. Valve needle 90 is biased toward the air-controlled piston 70. In another example, only a lateral edge 76 of air-controlled piston 70 facing valve needle 90 may be wedge-shaped requiring the air-controlled piston 70 to be non-rotatable. In additional alternative embodiments, the air-controlled piston 70 may be selectively rotatable so that different slope profiles around the wedge-shaped portion 78 can face valve needle 90. The slope of the wedge-shaped portion 78 controls how aggressively the valve needle 90 rises in response to movement of the air-controlled piston 70. In certain embodiments, air-controlled piston 70 may include different slope profiles which can be selectively oriented toward the valve needle to allow the response profile to be selectively altered.

When sufficient pressure is applied, the air-controlled piston 70 slides laterally away from the pressure source. As the wedge-shaped portion 78 translates with the air-controlled piston 70, the contact point position between the wedge surface 79 and the ball bearing 100 is dynamically changed. The height of the contact point where the wedge-shaped portion's surface 79 engages the ball bearing 100 determines the height of the ball bearing 100 and consequently the height of the valve needle 90. As the air-controlled piston 70 moves laterally inward under pressure, the ball bearing 100 moves along the inclined height of the wedge-shaped portion 78 allowing the ball bearing 100 and valve needle 90 to rise. Conversely, when pressure is reduced, the air-controlled piston 70 moves laterally outward forcing the ball bearing 100 and the valve needle 90 downward.

Turning to FIG. 5, the lower end 24 and the damper piston assembly 26 of damper 20 are shown in an enlarged cross-sectional view. The damper 20 operates by limiting the fluid flow between an upper chamber 112 and a lower chamber 114, limiting the movement of a damper piston head 110. The flow fluid is restricted through the damper piston head 110 by a pair of valve stacks comprised of a series of shims defining a fluid flow path, including compression valve shims 104 and rebound valve shims 106. During compression of the piston rod 150, fluid flows one way and is restricted by the compression valve shims 104. During extension of the piston rod 150, fluid flow in the opposite direction and is restricted by the rebound valve shims 106. In alternative embodiments, the shims may be the same or flipped to the alternative position. The resulting pressure differential is what creates the damping force of the unit. In certain embodiments, compression valve shims 104 differ from rebound valve shims, creating different compression and rebound characteristics for the damper. Overall damping may be altered by increasing or decreasing the quantity, thickness and/or arrangement of the valve shims 104 and 106.

When moving the position of the air-controlled piston 70, the position of the valve needle's 90 may be adjusted directly proportional to the amount of movement of the air-controlled piston 70. When pressure is applied to air-controlled piston 70, valve needle 90 moves upward toward a fully open position causing its lower end 94 to translate upward from a needle seat 120. This continuously opens or increases a bypass path/fluid flow path 102 in the piston head 110, allowing fluid in the suspension piston to bypass the damper piston head 110 and valve shims 104 and 106, thus increasing fluid flow and reducing resistance. In contrast, when pressure on the air-controlled piston 70 is reduced, the air-controlled piston 70 translates outward, correspondingly forcing the valve needle 90 downward to a closed position restricting the fluid flow path through the piston head. In other words, the fluid flow path 102 size is continuously decreased to decrease the allowed fluid flow through the fluid flow path 102. The valve needle's 90 lower end 94 approaches and then contacts the needle seat 120 decreasing or closing the bypass path 102. This decreases fluid flow and increases resistance. Different positions of the valve needle 90 adjust the size of the bypass path 102 between the needle seat 120 and the lower end 94 of the valve needle 90. The dynamic (i.e. capable of constant adjustment) control of the fluid flow through this bypass path controls the pressure differential between the upper chamber 112 and the lower chamber 114 of the damper piston head 110. Therefore, the effective damping force of the unit is adjusted as the valve needle 90 moves into or out of the needle seat 120.

The needle seat 120 may further include a check valve 130, for example a check ball valve. The check valve 130 only allows flow in one-direction depending on the configuration installed. The check valve 130 may allow the valve needle 90 to affect only extension or only compression. The absence of a check valve 130 allows fluid to flow in both direction thus allowing the adjustment mechanism to control both compression and rebound simultaneously.

FIG. 6 illustrates an exploded view of control piston assembly 22 of damper 20 to further assist the understanding of this disclosure. Mounting plate 50 may include a vertical portion parallel to a mounting surface 31 of base 32. Bolts 54 may extend through openings 52 to secure mounting plate 50 to base 32.

In an alternate embodiment, the air-controlled piston 70 could be axially aligned with the valve needle 90. In that arrangement, no wedging would be necessary. In another embodiment, the air-controlled piston 70 may be coupled with a wedge mechanism that can be used to change the direction of force and/or the ratio of mechanical advantage in the system. These alternate packaging options for this system allows the same functional characteristics of the system but different mounting options. For example, this system could be mounted to the body of the suspension damper (as opposed to the piston rod) for control of a different valve circuit.

In addition, multiple adjustment mechanisms can be mounted on a single damper. This type of system would allow for separate, independent adjustments for the rebound damping and compression damping of the suspension damper.

The adjustment mechanism may be used with both analog and computer-controlled devices. In one embodiment, the user may manually select an input pressure to control the suspension damper forces. In other embodiments, more complicated systems could use a digital control to apply variable pressures based on environmental inputs from various other systems or sensors. This digital control could be the existing chassis or engine management computer system that exist on a vehicle.

The language describing the sides, surfaces and tops and bottoms of the disclosures components is not intended to be limiting in any manner. The language is solely included to aid in the understanding of the disclosure.

While the disclosure has been illustrated and described in detail in the drawings and foregoing description, the same is to be considered as illustrative and not restrictive in character, it being understood that only the preferred embodiment has been shown and described and that all changes, equivalents, and modifications that come within the spirit of the disclosure defined by the following claims are desired to be protected.

The invention claimed is:

1. A hydraulic damper with one end connected to a body of a vehicle and a second end connected to a suspension, comprising:
    a pressure tube defining an interior cavity, wherein hydraulic fluid fills at least a portion of the interior cavity of the pressure tube;
    a piston head slidably arranged in the interior cavity of the pressure tube and dividing the interior cavity into an upper chamber and a lower chamber, wherein the piston head defines a hydraulic fluid flow path between the upper chamber and the lower chamber;
    a piston rod with one end connected to the piston head, wherein movement of the piston rod relative to the pressure tube causes the piston head to slidably move within the pressure tube and wherein the fluid flow path size controls the resistance as the piston head moves;
    a valve needle arranged within the piston rod and configured to translate within a defined range, wherein at one end of the range the valve needle is in a closed position restricting the fluid flow path through the piston head, wherein at a second end of the range the valve needle is in a fully open position, and wherein as the valve needle moves from the closed position to the fully open position the fluid flow path size is continuously increased to allow an increase in fluid flow through the fluid flow path;
    wherein as the valve needle moves from the fully open position to the closed position, the fluid flow path size is continuously decreased to decrease the allowed fluid flow through the fluid flow path; and
    an air-controlled piston operatively connected to a compressed air source, wherein the air-controlled piston slides within a defined range in response to changes in the compressed air pressure applied, wherein the air-controlled piston is operably engaged with the valve needle, and wherein movement of the air-controlled piston moves within the air-controlled piston's defined range causes the valve needle to translate a correlated distance within the valve needle's defined range.

2. The hydraulic damper of claim 1, wherein the air-controlled piston is biased against the compressed air pressure applied by a resistance spring.

3. The hydraulic damper of claim 1, wherein as the air-controlled piston moves inward in response to an increase in air pressure, the valve needle translates away from the closed position to enlarge the fluid flow path through the piston head.

4. The hydraulic damper of claim 1, wherein as the air-controlled piston moves outward in response to a decrease in air pressure, the valve needle translates toward the closed position decreasing the fluid flow path through the piston head.

5. The hydraulic damper of claim 1, wherein the movement axis of the air-controlled piston is perpendicular to the movement axis of the valve needle.

6. The hydraulic damper of claim 5, wherein an inward portion of the air-controlled piston defines a wedge-shaped portion, wherein the wedge-shaped portion defines an inclined height, wherein the valve needle engages the wedge-shaped portion via a ball bearing, and wherein the height of the ball bearing as the ball bearing moves along the wedge-shaped portion controls the height of the valve needle.

7. The hydraulic damper of claim 6, wherein the wedge-shaped portion is a conical wedge-shaped portion.

8. The hydraulic damper of claim 1, wherein the valve needle is biased to the closed position.

9. The hydraulic damper of claim 1, wherein the amount of compressed air pressure applied to the air-controlled piston is dynamically controlled by a computer in response to detected driving conditions, wherein the computer increases or decreases the compressed air pressure to proportionately increase or decrease the fluid flow path size.

10. The hydraulic damper of claim 1, wherein the air-controlled piston includes a body defining a hollow interior cavity.

11. A method of dynamically controlling translation of a valve needle within a hydraulic damper connected between a body and a suspension of a vehicle, comprising:
    applying compressed air from a compressed air source to a portion of the hydraulic damper to control the position of a control piston;
    controlling the position of the control piston, wherein the control piston is operably engaged with the valve needle, wherein the valve needle is configured to translate within a defined range, wherein at one end of the range the valve needle is seated in a closed position restricting a fluid flow path between an upper chamber and a lower chamber, wherein at a second end of the range the valve needle is in a fully open position, wherein as the valve needle moves from the closed position to the fully open position the fluid flow path size is continuously increased to allow an increase in fluid flow between the upper chamber and the lower chamber, and wherein as the valve needle moves from the fully open position to the closed position the fluid flow path size is continuously decreased to decrease the allowed fluid flow through the fluid flow path; and
    wherein adjusting the position of the control piston adjusts the position of the valve needle directly proportional to the amount of movement of the control piston.

12. The method of claim 11, further comprising:
    biasing the control piston against the compressed air pressure applied.

13. The method of claim 11, wherein as the control piston moves in response to an increase in the applied air pressure, the valve needle translates away from the closed position to enlarge the fluid flow path.

14. The method of claim 11, wherein as the control piston moves in response to a decrease in the applied air pressure, the valve needle translates toward the closed position decreasing the fluid flow path.

15. The method of claim 11, wherein the control piston has a wedge-shaped portion, wherein the wedge-shaped portion defines an inclined height, wherein the valve needle engages the wedge-shaped portion via a ball bearing, wherein the height of the ball bearing as the ball bearing moves along the wedge-shaped is directly correlated to the height of the valve needle.

16. The method of claim 15, wherein the wedge-shaped portion is a conical wedge-shaped portion.

17. The method of claim 11, wherein the amount of compressed air pressure applied to the control piston is dynamically controlled by a computer in response to detected driving conditions, wherein increasing or decreasing the compressed air pressure applied proportionately increases or decreases the fluid flow path size.

18. A hydraulic damper connected between a body of a vehicle and a suspension, comprising:
- a pressure tube defining an interior cavity, wherein hydraulic fluid fills at least a portion of the interior cavity of the pressure tube;
- a piston head slidably arranged in the interior cavity or the pressure tube and dividing the interior cavity of the pressure tube into an upper chamber and a lower chamber, wherein the piston head defines a fluid flow path between the upper chamber and the lower chamber and wherein the fluid flow path size controls the resistance as hydraulic fluid moves through the piston head;
- a piston rod with one end connected to the piston head;
- a valve needle arranged to translate within a defined range within the piston rod, wherein as the valve needle moves in one direction the fluid flow path size is increased to decrease the resistance to hydraulic fluid moving through the fluid flow path and wherein as the valve needle moves in the opposition direction, the fluid flow path size is decreased to increase the resistance to hydraulic fluid moving through the fluid flow path;
- a control piston, wherein the control piston slides within a defined range in response to control inputs; and
- wherein the control piston is operably engaged with the valve needle, and wherein movement of the control piston causes the valve needle to translate a correlated distance to adjust the fluid flow path size.

19. The hydraulic damper of claim 18, wherein the movement axis of the control piston is perpendicular to the movement axis of the valve needle.

20. The hydraulic damper of claim 19, wherein the control piston has a wedge-shaped portion, wherein the wedge-shaped portion defines an inclined height, wherein the valve needle engages the wedge-shaped portion via a ball bearing, and wherein the height of the ball bearing as the ball bearing moves along the wedge-shaped portion controls the height of the valve needle.

* * * * *

UNITED STATES PATENT AND TRADEMARK OFFICE
CERTIFICATE OF CORRECTION

PATENT NO. : 11,577,575 B2
APPLICATION NO. : 17/446378
DATED : February 14, 2023
INVENTOR(S) : Alan Jeffrey Wilber It is certified that error appears in the above-identified patent and that said Letters Patent is hereby corrected as shown below:

In the Claims

Column 9, Claim 18, Line 21, replace "or" with --of--

Signed and Sealed this
Eleventh Day of April, 2023

Katherine Kelly Vidal
Director of the United States Patent and Trademark Office